Dec. 24, 1968    E. L. DRUMMOND ET AL    3,418,097
MICROHEMATOCRIT TUBE SEALER
Filed Aug. 30, 1965

INVENTORS
EDWARD L. DRUMMOND
MICHAEL E. DRUMMOND
BY Garvey & Garvey
ATTORNEYS

United States Patent Office 3,418,097
Patented Dec. 24, 1968

3,418,097
MICROHEMATOCRIT TUBE SEALER
Edward Louis Drummond and Michael E. Drummond,
Havertown, Pa., assignors to Drummond Scientific
Company, Broomall, Pa.
Filed Aug. 30, 1965, Ser. No. 483,648
4 Claims. (Cl. 65—269)

ABSTRACT OF THE DISCLOSURE

A microhematocrit tube sealer including a unit having a self-contained heater adapted for the reception of the terminal of a glass capillary hematocrit tube which is to be sealed, an assembly in the unit operable to position a part thereof in the path of the tube to limit the extent of its movement into the unit, the assembly further including means for moving said part of the assembly away from the tube to expose the inner end of the latter to heat from the self-contained heater of the unit, to effect sealing.

---

This invention is a microhematocrit tube sealer for sealing an end of a glass capillary hematocrit tube of desired length and diameter, by the application of heat, directly, to the end of the tube to be sealed, and has for an object the provision of a self-contained heating unit in which the tube is slidably mounted to place the end of the tube in the heat zone, where it is held from displacement or vibration, for a predetermined time, usually with five seconds, to effect sealing and then is withdrawn for processing of the blood.

Further objects of the invention are to provide an assembly in a unit, a part of which assembly is movable to provide an abutment in the unit, limiting the extent of movement of the tube in the unit, and thereby fix the locus of the tube end, in most advantageous position with respect to the heating element of the heating unit, another part of the assembly being in operative engagement with said abutment, to move the latter sufficiently to expose a heat-conveying passageway over which the end of the tube is held in the unit, the tube being manually removed after having been exposed to the heat for a predetermined time for fusing the end of the tube to effect sealing; and to provide a small, relatively inexpensive unit from which the heat supplying element may be expeditiously removed and replaced or replenished, depending upon the kind of heat supply element used.

Still another object of this invention is to provide a heating unit which may be modified to hold a plurality of capillary tubes the inner ends of which may be simultaneously fused and sealed, either from a separate source, or from a self-contained heating element.

Other objects of the invention will be manifest from the following description of the present preferred forms of the invention, taken in connection with the accompanying drawings, wherein.

Figure 2:
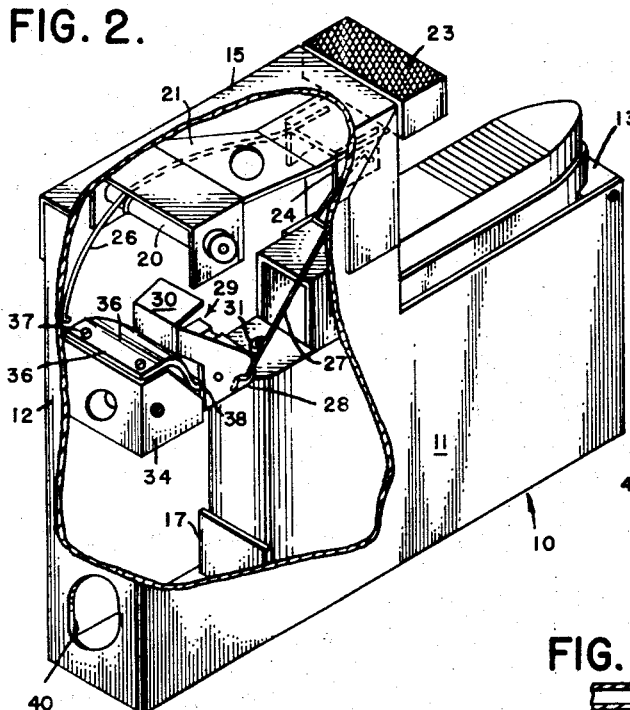
FIG. 2 is a similar view of the sealer, with a part broken away to disclose details.

The device of this invention, in a preferred form, shows a self-contained heating unit generally designated 10, which includes side walls 11 and front and rear end walls 12 and 13 respectively, the latter being detachable. The side walls, at one end, extend upwardly, as indicated at 14, and are encased in a closure 15.

Where a self-contained lighter is used, it may be slidably inserted between the aft ends of the sides 11 before the end wall 13 is engaged thereto. A conventional pocket lighter is here shown at 16, and illustrated to advantage, mounted between the walls 11, in FIGS. 2, 5, 6, and 7. Forward movement of the lighter is limited, in any suitable manner such as stop 17, to strategically position the flame 18 of the lighter between the extended upper edges 14 of the walls 11 at a selected position where effective sealing is assured.

Figure 5:
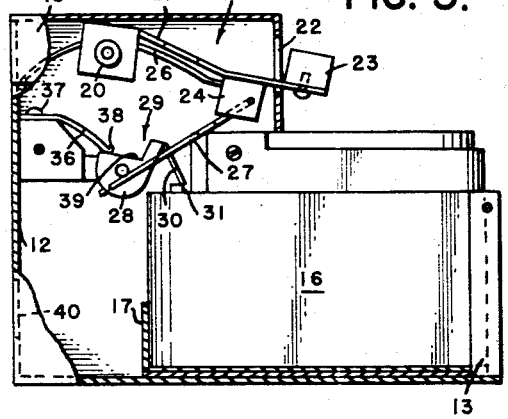
FIG. 5 is a side elevational view of the heating unit, with one of its side walls removed to show details and to illustrate the manner of mounting a conventional heating unit therein.
Figure 6:
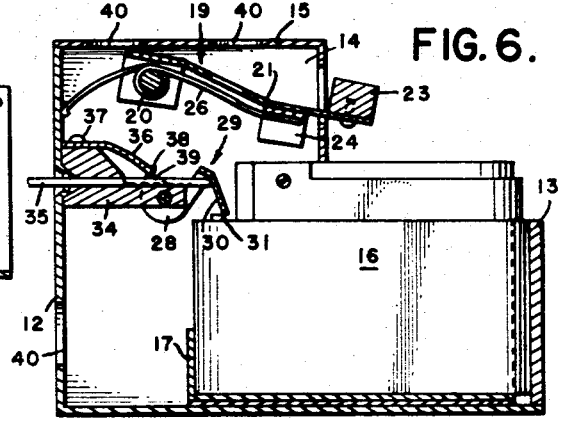
FIG. 6 is a vertical sectional view of the invention taken on the line 6—6 of FIG. 1, looking in the direction of the arrows.
Figure 7:
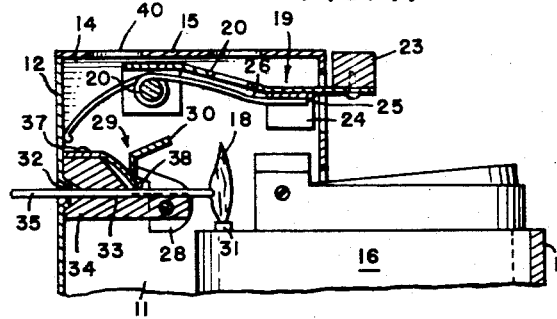
FIG. 7 is a fragmentary sectional view of the sealer in operating position showing an end of the tube in the flame of the heat-supplying element.

An operating entity or assembly generally designated 19 is positioned between the walls 11 and extensions 14 and comprises a cross rod 20, upon which a lever 21 is fulcrumed, after the manner shown in FIGS. 2 and 5 to 7. The free end of the lever 21 projects through an opening 22 in closure 15, and carries on its terminal, a spring-loaded presser bar 23. A pair of lugs 24 depend from opposite side edges of the lever 21, the lugs being the opposite right angle terminals of an elongated plate 25, which extends across and is secured to the bottom face of lever 21, as shown to advantage in FIG. 7. The lug 24, shown in FIG. 7, is engaged by one end of a wire spring 26, an intermediate part of the spring being convoluted on rod 20, the other end of the spring being flexed against the inner face of front wall 12 is illustrated in FIGS. 5 to 7.

The opposite lug 24, as shown in FIG. 5, is engaged by one end of a wire spring 27, the opposite end of the latter extending to, through, and with a cam section 28 of an abutment unit 29, which is also included in the assembly 19. The abutment unit embodies a plate 30, which, when the finger presser bar 23 is down, as shown in FIGS. 5 and 7, extends across a fuel passageway 31 from the lighter 16.

Figures 1, 8:
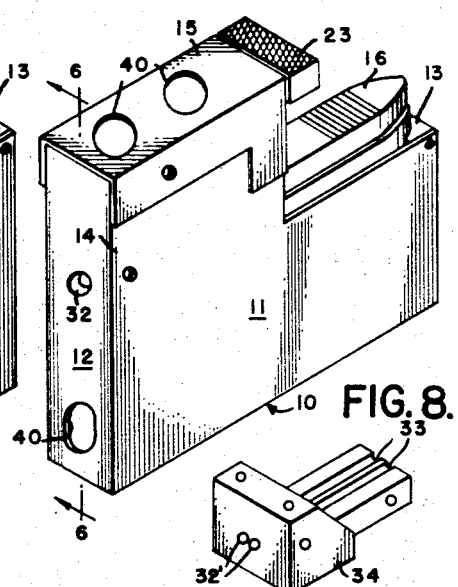
FIG. 1 is a perspective view of a microhematocrit tube sealer constructed in accordance with the present invention.
FIG. 8 is a fragmentary perspective view of a modified form of the invention used for supporting a plurality of tubes.

The front of the sealer is provided with a tube access opening 32, as shown in FIG, 7, or multiple openings 32', as shown in the modified form of FIG. 8, where multiple tubes are to be accommodated. These openings commuicate with complemental passageways 33 in guide blocks 34. When the presser bar 23 is in the "down" position, the abutment plate 30 intercepts the tube designated 35, as shown in FIG. 6. Release of pressure on the bar 23 permits the springs 26 and 27 to operate and return the abutment unit to the position shown in FIG. 7. Cooperating with the abutment unit is a resilient plate 36, one end of which is secured, as shown at 37, to the top of guide block 34. The free curled edge 38 of plate 36 bears against a flat surface 39 of the cam section 28 when the finger bar 23 is in the "down" position shown in FIG. 5. When the finger bar moves to the "up" position, as shown in FIG. 7, the abutment unit 29 is moved to the position shown, to clear the tube passageway 33 for the tube or tubes and permits the free curled edge 38 to engage the tube or tubes as also shown in FIG. 7. When the tube is in this position, the heating element of the heating unit may be activated, by pressing down the top of pocket lighter 16, to produce flame 18. The tube 35, by the above arrangement, is secured from movement and vibration, which is essential in sealing capillary tubes. Furthermore, the flame will not flicker, because it is protected on all sides from air currents and the like, in the environment shown.

The front wall 12 and closure 15 are provided, at selected locations, with air vents 40.

Figure 3:
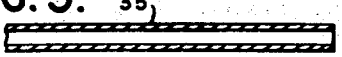
FIG. 3 is a longitudinal sectional view of a conventional microhematocrit tube, both ends of which are open.
Figure 4:
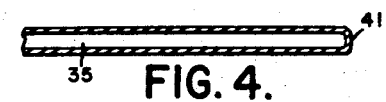
FIG. 4 is a similar view showing one end of the tube sealed.

In FIGS. 3 and 4, fragments of the capillary tubes 35 are shown. In FIG. 4, one end of the tube is sealed, as indicated at 41. This seal is formed in an exposure of the tube end to a heating element, such as an open flame, in about five seconds. As shown in the drawings, it is preferred that the outer ends of the tube passageway be flared to facilitate insertion of the tube.

Although there has been herein shown and described a pocket lighter as the source of heat for fusing the end of the tube or tubes together to effect sealing, it is to be understood that various other sources of heat may be employed for this purpose.

Various other changes may be made within the scope of the claims hereto appended.

What is claimed is:

1. A microhematocrit tube sealer including a body equipped with a tube guide block and a self-contained heater, an assembly movably mounted in the body and operable outside the latter by a manually operated projecting part of the assembly, movement in said projecting part in one direction actuating an abutment portion of the assembly to a position adjacent the inner end of the block for controlling the extent of movement of a tube beyond said inner end of the block, the assembly further including springs operable, when pressure is released from said projecting part to automatically move the abutment part away from the inner end of the block to expose the tube to the heater of the body.

2. A microhematocrit tube sealer including a self-contained heater unit, the unit comprising an enclosure, an access opening in said enclosure through which an end of the tube to be sealed is passed, a guide block mounted within the enclosure adjacent the opening, the guide block having a passageway in which the tube rests, an abutment unit rotatably mounted within said enclosure adjacent said guide block, said abutment unit embodying a rotatable cam section and an abutment plate connected to said cam section, an operating member connected to said abutment unit for actuating the latter to rotate the abutment plate into the path of movement of the tube, to limit the extent of movement of the tube into the enclosure, spring means engaged with said abutment unit for rotating the latter to an inoperative position upon release of said operating member, and a heat source within the enclosure subjacent the point of maximum entry of the tube into the enclosure, to permit fusing the tube end and effect sealing thereof.

3. The microhematocrit tube sealer of claim 2, with the addition of a spring member carried by said guide block and normally disposed in tensioning engagement with a tube to be sealed, to prevent accidental longitudinal displacement of the tube prior to sealing, said spring member being in engagement with said cam section and urged out of engagement with the tube by the cam section upon rotation of the latter, to facilitate insertion of the tube into the unit.

4. The microhematocrit tube sealer of claim 2, wherein said enclosure is provided with a plurality of access openings and said guide block has multiple passageways in communication with the access openings to permit simultaneous sealing of a plurality of tubes.

References Cited

UNITED STATES PATENTS

| | | | |
|---|---|---|---|
| 1,162,972 | 12/1915 | Brabson | 126—238 |
| 1,397,631 | 11/1921 | Goodchild | 65—276 |
| 3,273,989 | 9/1966 | Gubitose et al. | 65—276 |

FOREIGN PATENTS 788,400  1/1958  Great Britain.

OTHER REFERENCES

"Textbook in Clinical Pathology," Miller (1960), RB 37T4 Class 73/61.4, pp. 43–46.

DONALL H. SYLVESTER, *Primary Examiner.*

R. L. LINDSAY, *Assistant Examiner.*

U.S. Cl. X.R.

65—276; 73—61.4; 263—9; 65—284, 120